UNITED STATES PATENT OFFICE.

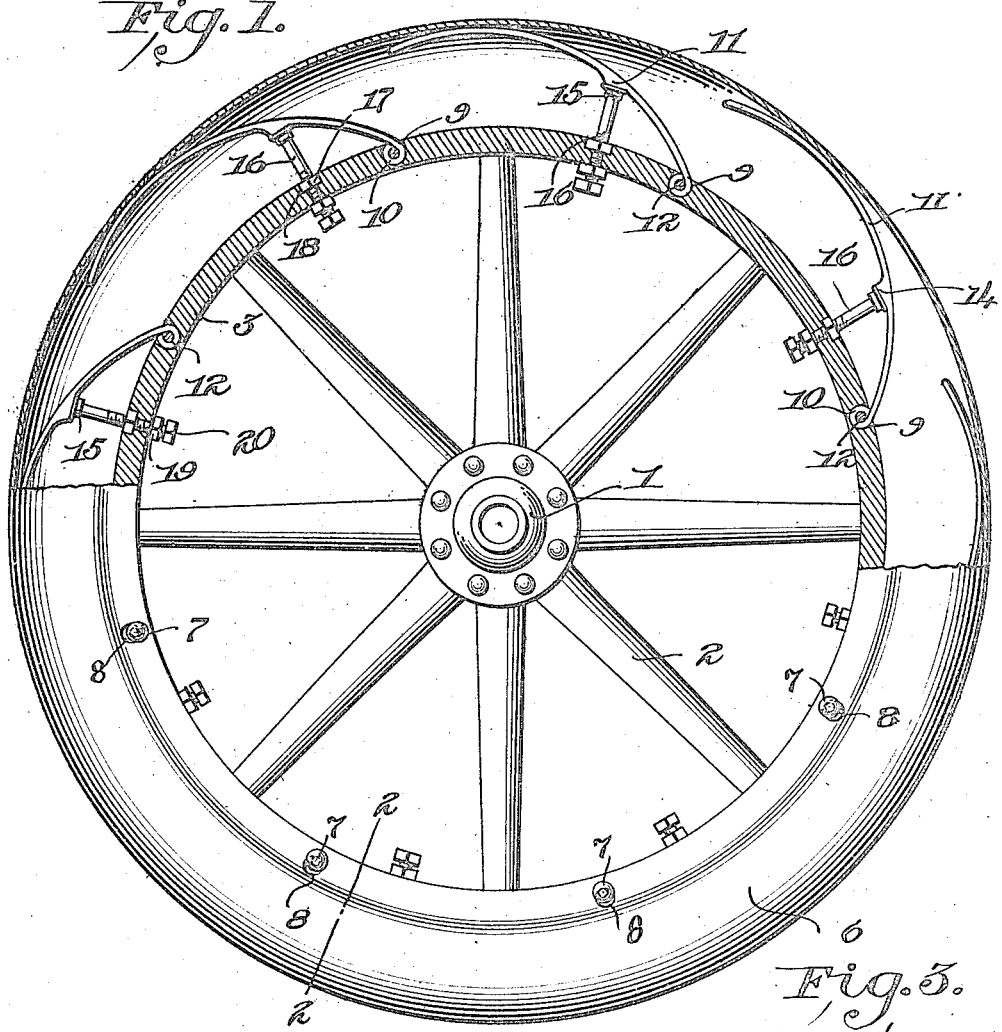

SAMUEL A. ROBERTS, OF CORSICANA, TEXAS.

RESILIENT WHEEL.

1,253,531. Specification of Letters Patent. Patented Jan. 15, 1918.

Application filed November 19, 1913. Serial No. 801,974.

*To all whom it may concern:*

Be it known that I, SAMUEL A. ROBERTS, a citizen of the United States, residing at Corsicana, in the county of Navarro and State of Texas, have invented certain new and useful Improvements in Resilient Wheels, of which the following is a specification.

This invention relates to a new and useful resilient vehicle wheel embodying flat arcuate springs by means of which the tread or shoe of the wheel is resiliently mounted with relation to the hub.

The primary object of this invention is the provision of a resilient wheel having a cushioned tread which embodies many of the desirable features of a pneumatic tread and which eliminate the defects or undesirable features of the same.

With the foregoing and other objects in view, this invention consists in such novel features of construction, combination and arrangement of parts as will be hereinafter described, illustrated in the accompanying drawings and claimed.

In describing this invention in detail reference will be had to the accompanying drawings wherein like characters of reference designate like or corresponding parts throughout the several views, and in which, Figure 1 is a side elevation of the improved resilient wheel showing a part of the tread or shoe of the same broken away so as to expose the flat arcuate springs, and Fig. 2 is a cross sectional view on the line 2—2 of Fig. 1.

Fig. 3 is a sectional view of a modified form of the tire of the wheel.

Referring more particularly to the drawings, 1 designates the hub of the wheel which has a plurality of spokes 2 extending radially therefrom. The spokes 2 are connected to the hub in any desirable manner such as is now in common use and have a rim or felly 3 secured to their outer ends. The rim or felly 3 has the lower straight ends 4 and 5 of the shoe or tread 6 of the wheel connected to its sides by means of bolts 7 which are slidably seated in openings 8. The openings 8 are formed in the lower straight ends or edges of the shoe or tread 6 and the bolts 7 being loosely or slidably mounted within the openings yieldably connect the shoe or tread to the rim 3. The tread or shoe 6 is preferably constructed of sheet metal and is bent, intermediate its ends to assume a rounded surface in conformity with the surface of pneumatic tires and also to provide a more efficient and practical tread for the vehicle wheel.

The rim 3 is provided with a plurality of recesses 9 formed in its outer surface. The recesses 9 have the curved ends 10 of the flat arcuate springs 11 pivotally mounted thereon by means of pins 12 which extend laterally through the recesses. The flat arcuate springs 11 are mounted upon the pins 12 by the curving of their inner ends 10 about the pins as is clearly shown in Fig. 1 of the drawings. The flat arcuate springs 11 extend diagonally across the opening within the tread or shoe and contact with the inner surface of the tread at a point near the outer ends of the spring. The flat arcuate springs 11 have abutments 14 formed upon their under surface against which the flat enlarged ends 15 of bolts 16 rest. The bolts 16 extend through openings in the rim 3, and through nuts 17, which are firmly seated in cut out portions 18 formed in the rim 3. The ends of the bolts 16 protrude through the rim 3 and have nuts 19 and 20 mounted upon their outer protruding ends. The bolts 16 and the nuts 17, 19 and 20 form means for regulating the tension of the flat arcuate springs 11 and thereby regulating the resiliency of the shoe or tread 6 in that when they are forced outwardly the tension between the springs 11 and the shoe or tread is increased thereby increasing the resiliency of the wheel and cushioning features of the tread and when they are moved inwardly relieving the tension between the springs 11 and the shoe or tread 6.

In Fig. 3 of the drawings, a modified form of the tire, for the wheel is shown. This view shows the rim 30, which is made separate from the wheel, provided with a plurality of recesses 31 formed in its outer surface, for the reception of the nuts 19' and 20', which are mounted upon the ends of the bolts 16', so that the resilient tire, as above described, may be mounted upon the periphery of any type of ordinary automobile wheel that has the rim thereof provided with a pair of grooves as designated by the numeral 21', the said grooves allowing for the inward movement of the tread or shoe 6.

In practical fields certain minor features of construction may necessitate alterations to which the patentee is entitled provided such alterations are comprehended within the scope of what is claimed.

What is claimed is:

A resilient wheel including a rim and a tread movably carried thereby, a plurality of arcuate springs carried by said rim and in engagement with said tread, each of said springs having an enlargement thereon providing a flat face disposed parallel to said rim and tension controlling means for each spring including a head for engagement with the flat faces of said enlargements.

In testimony whereof I affix my signature in presence of two witnesses.

SAMUEL A. ROBERTS.

Witnesses:
B. L. DAVIS,
DELLA BROWN,
C. L. JESTER.

Copies of this patent may be obtained for five cents each, by addressing the "Commissioner of Patents, Washington, D. C."